(12) United States Patent
Tsumiyama et al.

(10) Patent No.: US 9,512,809 B2
(45) Date of Patent: Dec. 6, 2016

(54) UTILITY VEHICLE (71) Applicant: KAWASAKI JUKOGYO KABUSHIKI KAISHA, Hyogo (JP)

(72) Inventors: Yoshinori Tsumiyama, Miki (JP); Keiji Takahashi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,967

(22) Filed: Dec. 30, 2014

(65) Prior Publication Data
US 2016/0186705 A1 Jun. 30, 2016

(51) Int. Cl.
| | |
|---|---|
| *F02M 35/16* | (2006.01) |
| *F02M 35/04* | (2006.01) |
| *B60K 13/02* | (2006.01) |
| *B60K 11/06* | (2006.01) |
| *B60K 11/08* | (2006.01) |
| *B60P 1/00* | (2006.01) |
| *B60R 99/00* | (2009.01) |

(52) U.S. Cl.
CPC ............ *F02M 35/162* (2013.01); *B60K 11/06* (2013.01); *B60K 11/08* (2013.01); *B60K 13/02* (2013.01); *B60P 1/00* (2013.01); *B60R 99/00* (2013.01); *F02M 35/048* (2013.01); *F02M 35/161* (2013.01)

(58) Field of Classification Search
CPC .... F02M 35/04; F02M 35/048; F02M 35/161; F02M 35/162; F02M 37/14; F02M 37/221; B62D 25/082; B62D 25/085; B60K 5/00; B60K 5/12; B60K 13/00;B60K 13/02; B60K 15/00; B60K 15/063; B60K 15/067; B60K 15/03006; B60K 15/01; B60K 15/035; B60K 11/06; B60K 11/08; B60R 99/00; B60P 1/00
USPC ........................ 180/291, 292, 296, 68.3, 69.4
See application file for complete search history.

(56) References Cited

U.S. PATENT DOCUMENTS

| | | | | |
|---|---|---|---|---|
| 5,086,858 | A * | 2/1992 | Mizuta | B60K 11/06 123/41.56 |
| 7,147,076 | B2 * | 12/2006 | Izumi | B60K 23/08 180/250 |
| 7,882,912 | B2 * | 2/2011 | Nozaki | B60K 13/02 180/291 |
| 8,439,141 | B2 * | 5/2013 | Bessho | B60K 5/04 180/339 |

(Continued)

FOREIGN PATENT DOCUMENTS

JP         2002-70668         3/2002

*Primary Examiner* — John Walters
(74) *Attorney, Agent, or Firm* — Wenderoth, Lind & Ponack, L.L.P.

(57) ABSTRACT

A utility vehicle that includes: a chassis (1); a seat (6) provided on the chassis; a cargo bed (8) provided behind the seat; an engine (11) provided on the chassis; an intake device (101) for supplying combustion air to the engine; and a storage box (30) for storing equipment of the engine. The intake device has: an air intake duct (15) connected to the engine; an air cleaner device (21) connected to an air-intake upstream end of the air intake duct and stored in the storage box; and an extended air intake duct (16) connected to an air inlet of the air cleaner device. An air inlet (16A) of the extended air intake duct is located above a lower face (81) of the cargo bed and between the seat and the cargo bed.

7 Claims, 7 Drawing Sheets

(56) References Cited

U.S. PATENT DOCUMENTS 8,499,870 B2 * 8/2013 Nakamura ........... B62D 21/186
                                              180/68.3
2015/0061275 A1 * 3/2015 Deckard ............. B60G 21/055
                                              280/788

* cited by examiner

UTILITY VEHICLE

BACKGROUND OF THE INVENTION

1. Field of the Invention

The present invention relates to a utility vehicle and, in particular, to an intake system for an engine and a V-belt continuously variable transmission in a utility vehicle.

2. Description of the Prior Art

An intake system for an engine in a utility vehicle according to the conventional art includes: an air intake duct connected to an air inlet of the engine; and an air cleaner device connected to an air-intake upstream end of the air intake duct. In particular, in the utility vehicle, in order to avoid suctioning of dust particles, the air cleaner device is arranged in a storage box sealed from the outside and then air in the storage box is taken in through an air inlet of the air cleaner device. The storage box includes a box body and a lid. A sealing material is provided in the opening part of the box body and then the lid is openably and closably attached to the box body via the sealing material. Further, the storage box having a high sealing property stores: other equipments such as a battery and electric components; an air inlet part of a duct for cooling the transmission; and the like, which need be protected from rain, dust, and the like. Further, check or maintenance of the equipments such as the air cleaner device and the battery stored in the storage box is performed in a state that the lid is removed from the opening part. For example, JP Laid-open Publication No. 2002-70668 discloses such an intake system for an engine.

Meanwhile, the sealing material provided in the opening part of the box body causes a high cost. Nevertheless, in the intake system for an engine in a utility vehicle according to the conventional art, it is necessary to make the opening part a certain size or larger so as to check or maintenance of the equipments in the storage box is performed through the opening part. Thus, since a certain fixed amount of sealing materials has to be used, it was impossible to reduce the cost of sealing materials sharply.

SUMMARY OF THE INVENTION

The present invention has been devised in consideration of the above-mentioned problem, and an object of the present invention is to provide a utility vehicle in which the amount of use of sealing materials for a storage box storing an air cleaner device can be reduced so that the material cost can be reduced.

In order to achieve the object, the present invention provides a utility vehicle comprising: a chassis; one or a plurality of seat row(s) provided on the chassis; a cargo bed provided behind the seat row(s); an engine provided on the chassis; an intake device for supplying combustion air to the engine; and a storage box for storing equipment of the engine, wherein the intake device has: an air intake duct connected to the engine; an air cleaner device connected to an air-intake upstream end of the air intake duct and stored in the storage box; and an extended air intake duct connected to an air inlet of the air cleaner device, and wherein an air inlet of the extended air intake duct is located above a lower face of the cargo bed and between the seat row(s) and the cargo bed.

With the above-mentioned configuration, since the air inlet of the extended air intake duct is located above the lower face of the cargo bed and between the seat row(s) and the cargo bed, in the course of running, a situation that dust particles and water from the ground enter the extended air intake duct through the air inlet can be avoided. By virtue of this, clean air can be supplied through the extended air intake duct to the engine. Thus, for example, it is not necessary to improve the sealing property of the storage box and to supply the engine with clean air in the storage box. Therefore, since a sealing material for the storage box is not required, the amount of use of sealing materials and the material cost can be reduced.

Further, since the air inlet of the extended air intake duct is provided in a space between the cargo bed and the seat row(s), the space can be used effectively.

The present invention having the above-mentioned configuration is preferably equipped with the following configurations.

(a) The utility vehicle comprises a side cover for covering a side of the chassis in a vehicle width direction, wherein the air inlet of the extended air intake duct is opposite to the side cover from an inner side in the vehicle width direction at a fixed interval.

With the configuration (a), since the air inlet of the extended air intake duct is opposite to the side cover from the inner side in the vehicle width direction at a fixed interval, the side cover can more reliably avoid a situation that dust particles and water enter the extended air intake duct through the air inlet.

(b) The air inlet of the extended air intake duct is opposite to a backrest of the seat row(s) from a rear side of the seat row(s) at a fixed interval.

With the configuration (b), since the air inlet of the extended air intake duct is opposite to the backrest of the seat row(s) from a rear side of the seat row(s) at a fixed interval, for example, the cushion or the like of the backrest serves as a sound-absorbing material and the sound of air intake through the air inlet can be reduced by the cushion or the like.

(c) The utility vehicle comprises: a V-belt continuously variable transmission linked to the engine; and a cooling duct connected to the V-belt continuously variable transmission and supplying cooling air to the V-belt continuously variable transmission, wherein an air inlet of the cooling duct is located in the storage box.

With the configuration (c), since the air inlet of the cooling duct is located in the storage box, in comparison with a configuration of the air inlet being located in the outside of the storage box, a possibility that the dust particles and water from the ground are suctioned through the air inlet in the course of running can be reduced.

Further, the present invention provides a utility vehicle comprising: a chassis; one or a plurality of seat row(s) provided on the chassis; a cargo bed provided behind the seat row(s); an engine provided on the chassis; a V-belt continuously variable transmission linked to the engine; and a cooling duct connected to the V-belt continuously variable transmission and supplying cooling air to the V-belt continuously variable transmission, wherein an air inlet of the cooling duct is located above a lower face of the cargo bed and between the seat row(s) and the cargo bed.

With the above-mentioned configuration, since the air inlet of the cooling duct is located above the lower face of the cargo bed and between the seat row(s) and the cargo bed, in the course of running, a situation that dust particles and water from the ground enter the cooling duct through the air inlet can be avoided. By virtue of this, clean air can be supplied through the cooling duct to the V-belt continuously variable transmission. Thus, for example, it is not necessary to improve the sealing property of the storage box and to supply the V-belt continuously variable transmission with clean air in the storage box. Therefore, since a sealing material for the storage box is not required, the amount of use of sealing materials and the material cost can be reduced.

Further, since the air inlet of the cooling duct is provided in a space between the cargo bed and the seat row(s), the space can be used effectively.

The present invention having the above-mentioned configuration is preferably equipped with the following configurations.

(d) The utility vehicle comprises a side cover for covering a side of the chassis in a vehicle width direction, wherein the air inlet of the cooling duct is opposite to the side cover from an inner side in the vehicle width direction at a fixed interval.

With the configuration (d), since the air inlet of the cooling duct is opposite to the side cover from the inner side in the vehicle width direction at a fixed interval, the side cover can more reliably avoid a situation that dust particles and water enter the cooling duct through the air inlet.

(e) The air inlet of the cooling duct is opposite to a backrest of the seat row(s) from a rear side of the seat row(s) at a fixed interval.

With the configuration (e), since the air inlet of the cooling duct is opposite to the backrest of the seat row(s) from the rear side of the seat row(s) at a fixed interval, for example, the cushion or the like of the backrest serves as a sound-absorbing material and hence the sound of air intake through the air inlet can be reduced by the cushion or the like.

BRIEF DESCRIPTION OF THE DRAWINGS

The above and other objects, features, and advantages of the present invention will become more apparent from the following description taken in connection with the accompanying drawings, in which.

DETAILED DESCRIPTION OF THE PREFERRED EMBODIMENTS

FIGS. 1 to 8 show a utility vehicle according to the present invention, and on the basis of these drawings, an embodiment of the present invention will be described. For convenience of explanation, an advancing direction of the utility vehicle is explained as the "front" of the utility vehicle and the respective components thereof, and the left-right direction as viewed from the driver or the passenger of the vehicle is explained as the "left-right direction" of the vehicle and the respective components thereof.

Figure 1:
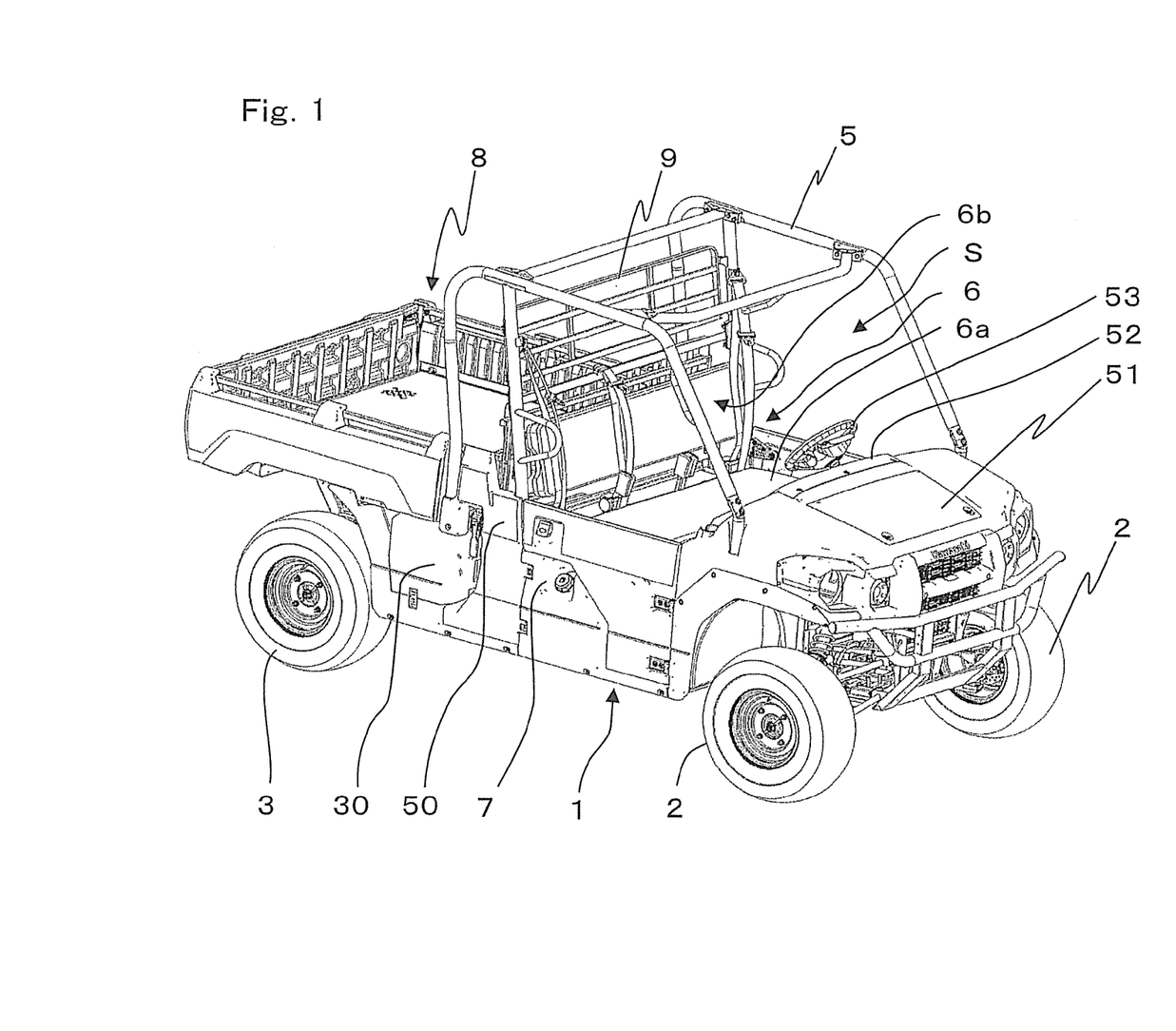
FIG. 1 is a perspective view showing a utility vehicle according to the present invention, viewed from the diagonally right front.

FIG. 1 is a perspective view showing the utility vehicle according to the present invention, viewed from the diagonally right front. The utility vehicle is used mainly for running in off-road circumstances like a grass field, a gravel field, and a sand field as well as an unpaved mountain path, an unpaved path through woods, a mud path, and a rocky field.

As shown in FIG. 1, a pair of left and right front wheels 2 is provided at a front part of a chassis 1 of the utility vehicle and a pair of left and right rear wheels 3 is provided at a rear part of the chassis 1. Side covers 50 for covering sides of the chassis 1 are provided on the side portions of the chassis 1. A boarding space S between the front wheels 2 and the rear wheels 3 is enclosed with a ROPS 5. Here, the ROPS 5 is an abbreviation for a rollover protective structure. A bench-type seat 6 is provided in the boarding space S. The seat 6 has a one-row seat configuration. A fuel tank 7 is provided under the seat 6. A cargo bed 8 is provided behind the seat 6. A screen 9 is provided between the cargo bed 8 and the boarding space S. A bonnet 51 is provided in front of the boarding space S, and a dashboard 52 is provided on the rear upper end portion of the bonnet 51. A steering wheel apparatus 53 and a shift lever apparatus, not shown, are provided on the dashboard 52 in a range where the driver sitting in the driver region 6a of the seat 6 can operate them.

The cargo bed 8 extends from a vicinity of a backrest 6b of the seat 6 to the rear side of the rear wheels 3 in a substantially horizontal direction. A storage box 30 is provided under the right side of the cargo bed 8 and in front of the rear wheels 3.

Figure 2:
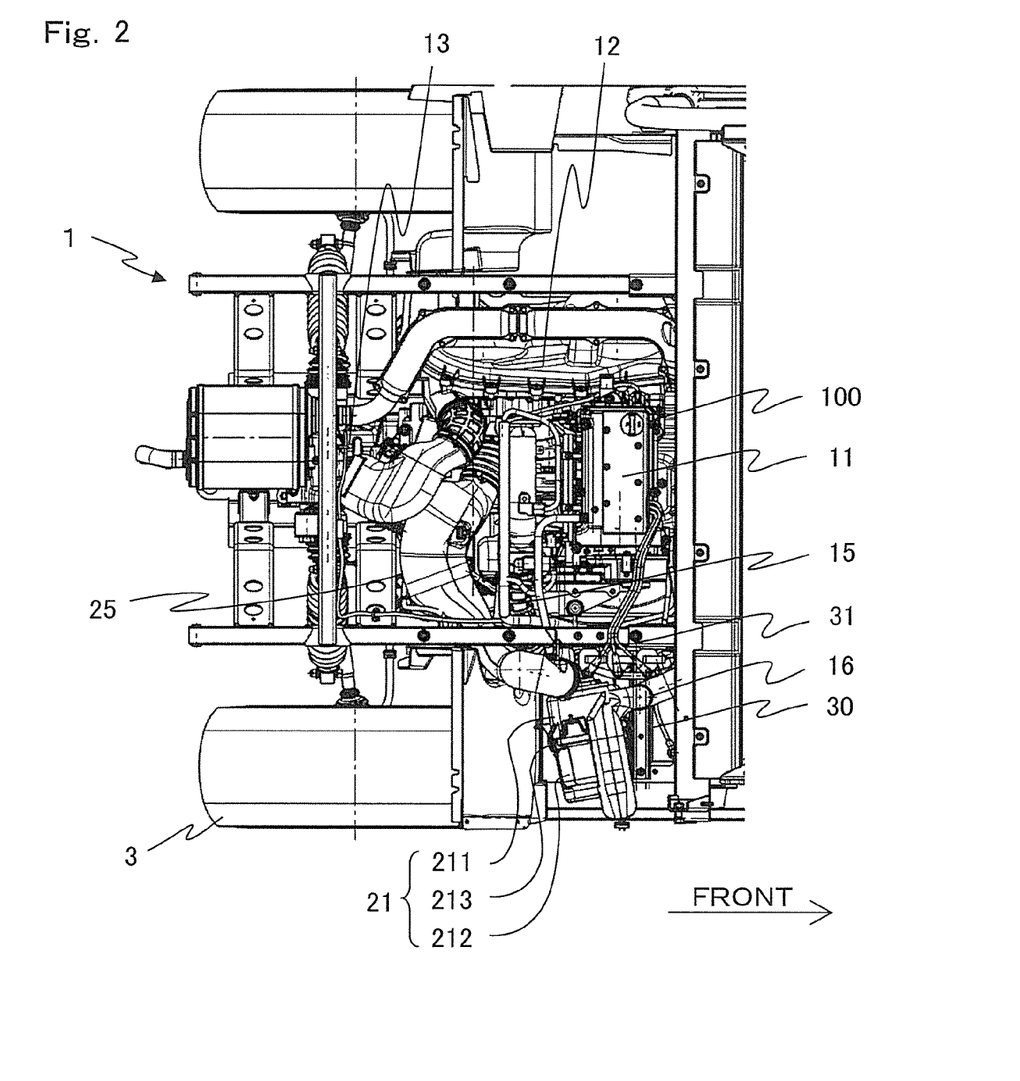
FIG. 2 is a plan view showing a structure of an engine and its vicinity of the utility vehicle.
Figure 3:
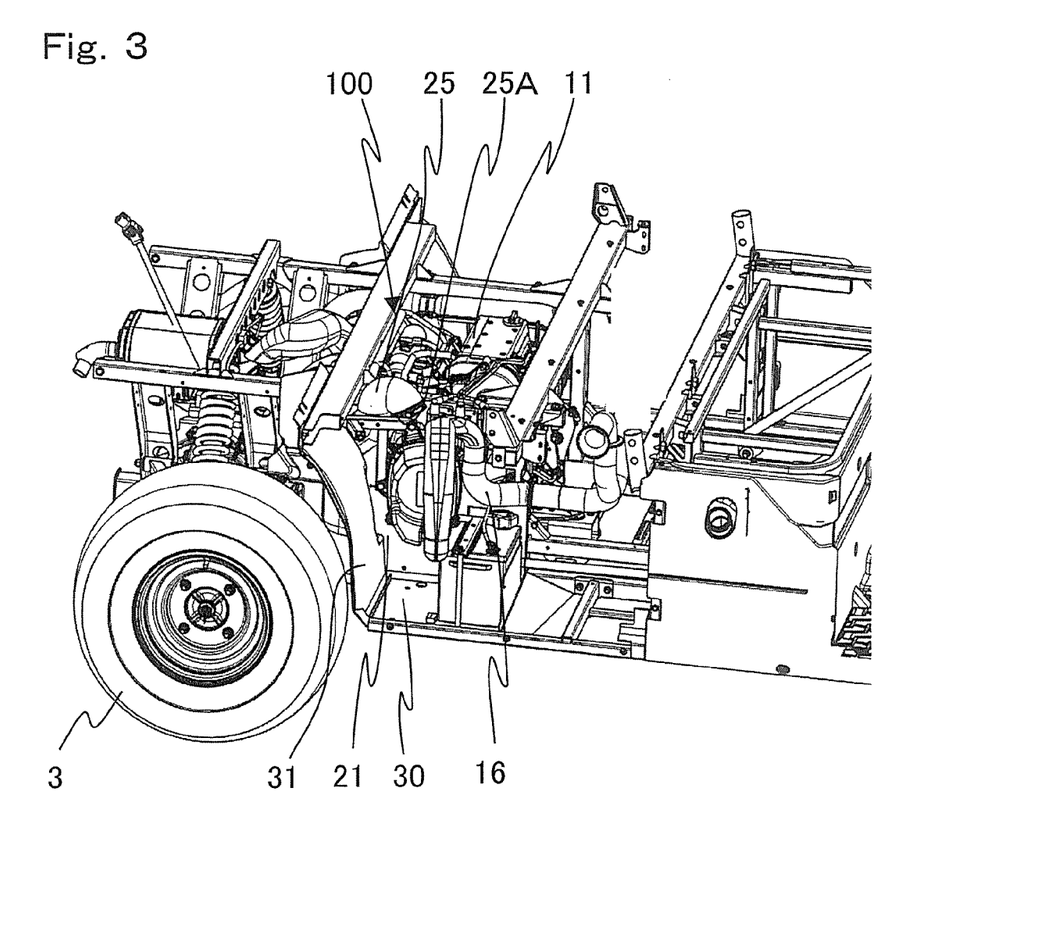
FIG. 3 is a perspective view showing an intake system for the engine and a V-belt continuously variable transmission of the utility vehicle, viewed from the diagonally right front.

FIG. 2 is a plan view showing a structure of an engine and its vicinity of the utility vehicle. FIG. 3 is a perspective view showing an intake system for the engine and a V-belt continuously variable transmission of the utility vehicle, viewed from the diagonally right front.

As shown in FIGS. 2 and 3, an engine room 100 is provided on the left side of the storage box 30. The engine room 100 and the storage box 30 are partitioned from each other by a partitioning wall 31. In the engine room 100, an engine 11 for driving, a V-belt continuously variable transmission 12, a gear type transmission 13, an air intake duct 15 for combustion air of the engine 11, a cooling duct 25 for cooling air of the V-belt continuously variable transmission 12 and the like are provided. The engine 11 is attached to the chassis 1. The V-belt continuously variable transmission 12 is connected to the left side of the engine 11. An output shaft of the engine 11 is linked through the V-belt continuously variable transmission 12 and the gear type transmission 13 to a rear axle, not shown, in a manner permitting power transmission. The rear wheels 3 are linked individually to both ends of the rear axle.

In the storage box 30, equipments such as the air cleaner device 21 and a battery, not shown, a part of the air intake duct 15, a part of the cooling duct 25 and the like are arranged.

The air cleaner device 21 has a substantially rectangular parallelepiped shape. The air cleaner device 21 has a body case 211, an air inlet case 212, a plurality of clamps 213, and a filter (not shown). The air inlet case 212 is detachably attached to the body case 211 with the plurality of clamps 213. The filter is stored in the body case 211.

In the air intake duct 15 of the engine 11, one end is connected to an intake manifold of the engine 11 and the other end is connected to the body case 211 of the air cleaner device 21. The air intake duct 15 constitutes a part of the intake system for the engine 11. One end of the cooling duct 25 of the V-belt continuously variable transmission 12 is connected to the V-belt continuously variable transmission 12. On the other hand, an air inlet 25A of the cooling duct 25 is located in the storage box 30. The cooling duct 25 constitutes a part of the intake system for the V-belt continuously variable transmission 12.

Figure 4:
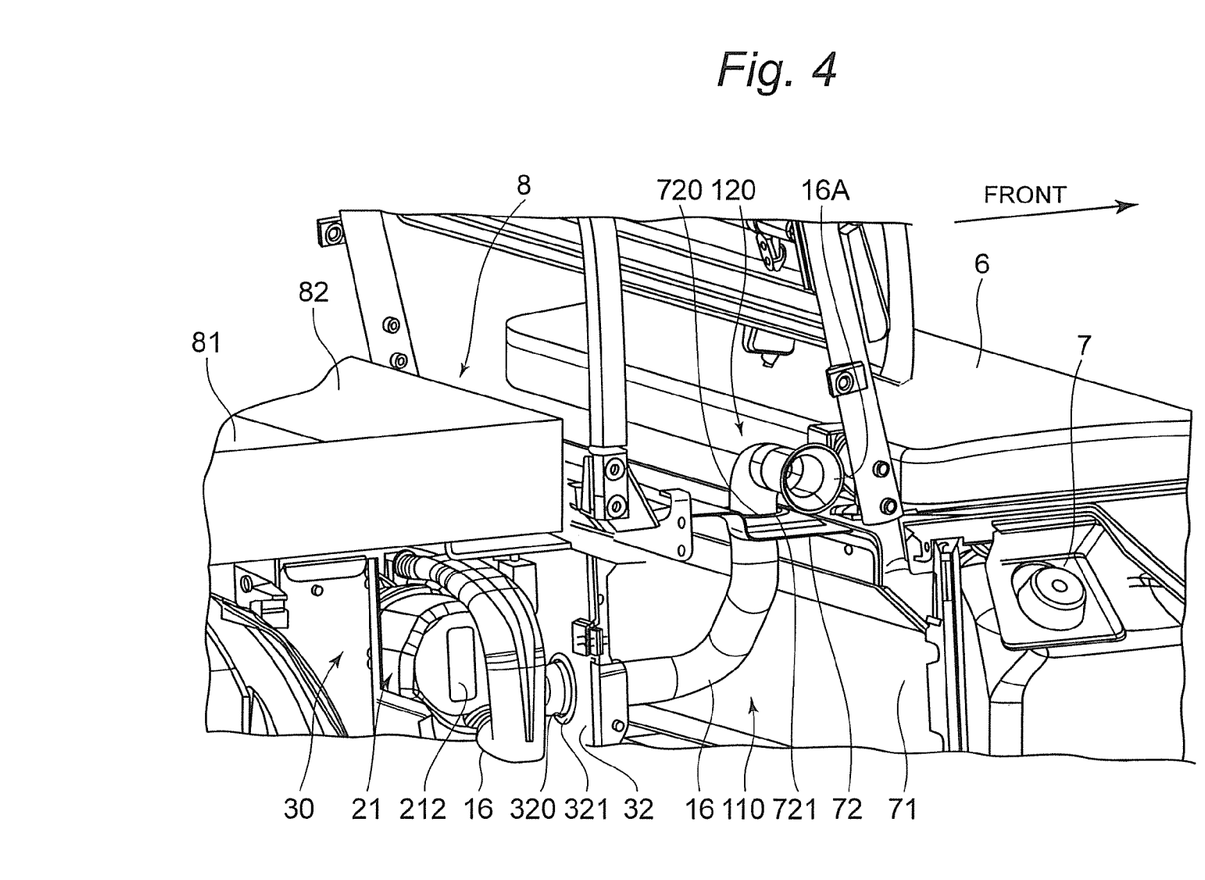
FIG. 4 is a perspective view showing an extended air intake duct of an intake system for the engine, viewed from diagonally right rear.

FIG. 4 is a perspective view showing an extended air intake duct of the intake system for the engine, viewed from diagonally right rear. Here, for simplicity of description, in FIG. 4, illustration of a part of components such as the side cover and the storage box lid is omitted.

As shown in FIG. 4, a first space 110 is provided between a front face 32 of the storage box 30 and a partition 71 provided behind fuel tank 7. A second space 120 is provided above the first space between a front face 82 of the cargo bed 8 and the seat 6. The first space 110 and the second space 120 are partitioned from each other by a partition 72 horizontally extending substantially in plane with the lower face 81 of the cargo bed 8.

A center part of a right side surface of the air inlet case 212 of the air cleaner device 21 is connected to one end of the extended air intake duct 16. The extended air intake duct 16 extends from the storage box 30 through the first space 110 to the second space 120. The other end of the extended air intake duct 16 is provided with an air inlet 16A for supplying air to the air cleaner device 21. The air inlet 16A is located above the second space 120, that is, above the lower face 81 of the cargo bed 8, and between the front face 82 of the cargo bed 8 and the seat 6. The shape of the air inlet 16A is circular. The extended air intake duct 16 extends in a vicinity of the air inlet 16A horizontally in the vehicle width direction. The portion of the extended air intake duct 16 in the vicinity of the air inlet 16A has a so-called funnel shape in which the radial-directional size of the extended air intake duct 16 continuously increases toward the air inlet 16A.

The extended air intake duct 16 penetrates, in a front-rear direction, a through hole 320 provided in the front face 32 of the storage box 30. An annular sealing material 321 is provided between a periphery of the through hole 320 and the extended air intake duct 16. Further, the extended air intake duct 16 penetrates, in a vertical direction, a through hole 720 provided in the partition 72 formed between the first space 110 and the second space 120. An annular sealing material 721 is provided between a circumferential part of the through hole 720 and the extended air intake duct 16.

Figure 5:
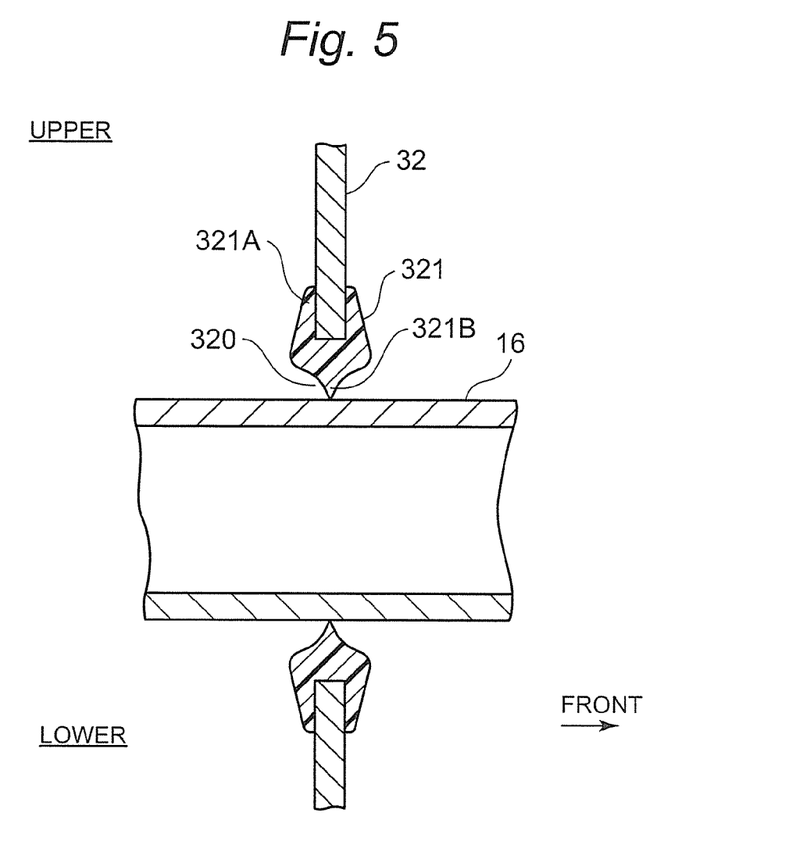
FIG. 5 is a sectional view describing a situation that the extended air intake duct is inserted into a through hole provided in a front face of a storage box of the utility vehicle.

FIG. 5 is a sectional view of a vicinity of the through hole 320 of the front face 32 of the storage box 30. FIG. 5 shows a situation that the extended air intake duct 16 is inserted into the through hole 320.

As shown in FIG. 5, an outer periphery part 321A of the annular sealing material 321 is formed in a U-shape in cross-section. The outer periphery part 321A is fit onto a hole edge of the through hole 320 of the front face 32. Further, the inner periphery part of the sealing material 321 is formed as a lip part 321B having an acute angle protruding inward in a radial direction. The lip part 321B is in contact with the outer peripheral surface of the extended air intake duct 16 so as to seal the through hole 320. Here, the annular sealing material 721 also has an outer periphery part and a lip part of similar shapes to those of the annular sealing material 321.

Figure 6:
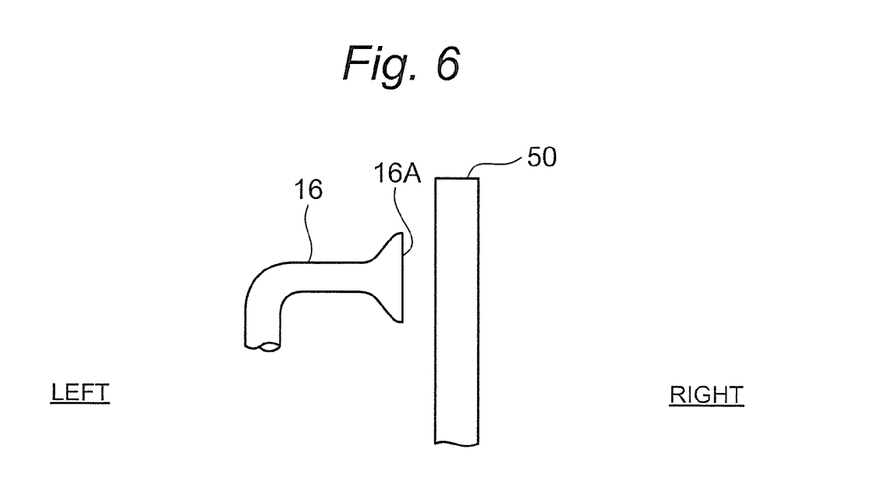
FIG. 6 is a schematic diagram describing the positional relation between an air inlet of the extended air intake duct and a side cover of the utility vehicle.

FIG. 6 is a schematic diagram describing the positional relation between the air inlet 16A of the extended air intake duct 16 and the side cover 50.

As shown in FIG. 6, the air inlet 16A is opposite to the side cover 50, that is, opened from the inner side in the vehicle width directions to the outward side (the rightward side). At the same time, the air inlet 16A is separated from the side cover 50 by a fixed interval. For example, the air inlet 16A is opposite to the side cover 50 with an interval of 10 mm to 50 mm in between.

Effects of Embodiment (1) Since the air inlet 16A of the extended air intake duct 16 is located above the lower face 81 of the cargo bed 8 and between the seat 6 and the cargo bed 8, in the course of running, a situation that dust particles and water from the ground enter the extended air intake duct 16 through the air inlet 16A can be avoided. By virtue of this, clean air can be supplied through the extended air intake duct 16 to the engine 11. Thus, for example, it is not necessary to improve the sealing property of the storage box 30 and to supply the engine 11 with clean air in the storage box 30. Therefore, since a sealing material for the storage box 30 is not required, the amount of use of sealing materials and the material cost can be reduced.

(2) Since the air inlet 16A of the extended air intake duct 16 is arranged in the second space 120 between the cargo bed 8 and the seat 6, the second space 120 can be used effectively.

(3) Since the air inlet 16A of the extended air intake duct 16 is opposite to the side cover 50 from the inner side in the vehicle width direction at a fixed interval, the side cover 50 can more reliably avoid a situation that dust particles and water enter the extended air intake duct 16 through the air inlet 16A.

Figure 7:
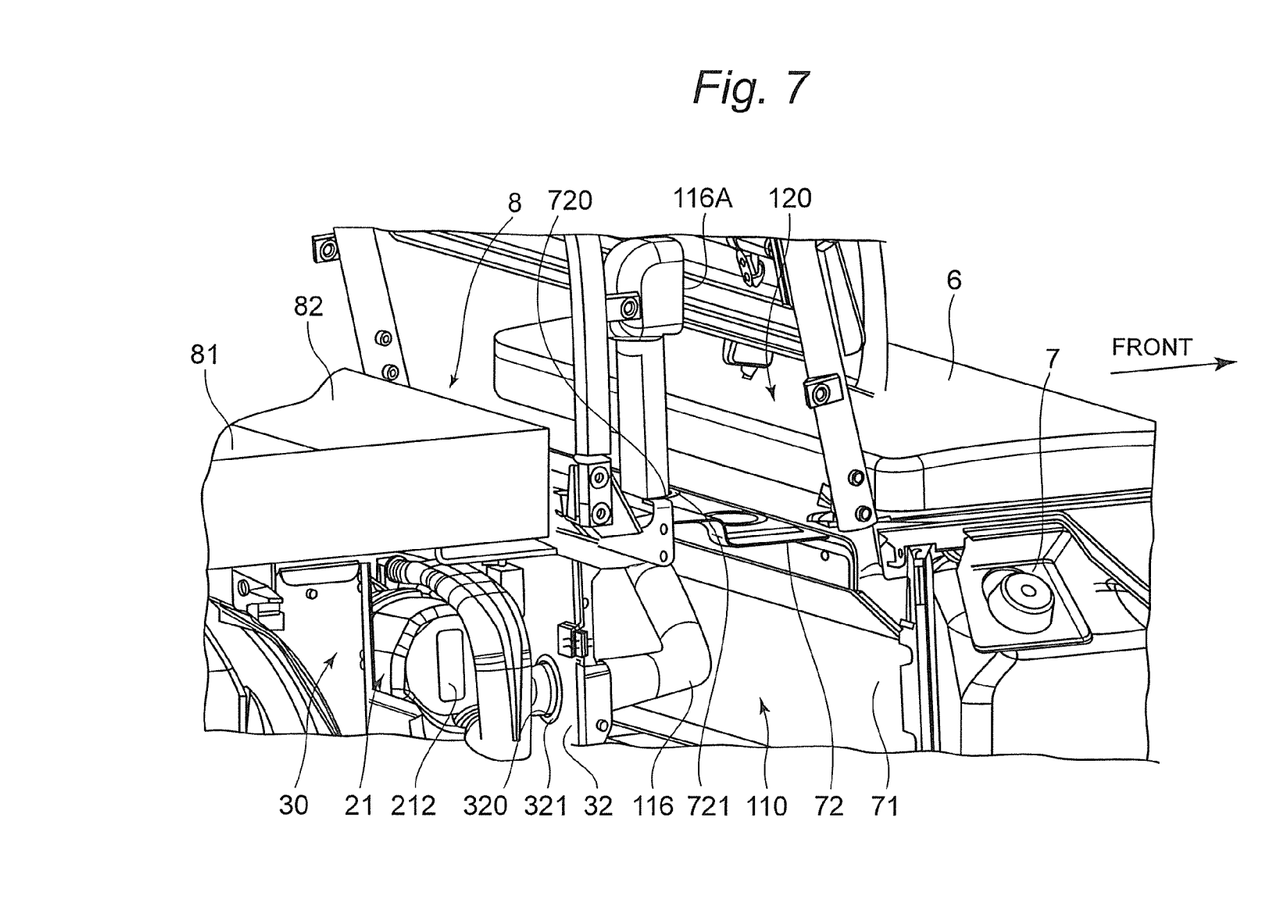
FIG. 7 is a perspective view showing a modification of the extended air intake duct.

Other Embodiments (1) Although the air inlet 16A of the extended air intake duct 16 has been opposite to the side cover 50 in the above-mentioned embodiment, employable configurations are not restricted to this configuration. For example, as shown in FIG. 7, an air inlet 116A of an extended air intake duct 116 may be provided opposite to the backrest 6b of the seat 6 and separate from the backrest 6b. Here, in FIG. 7, identical numerals to those in FIG. 4 indicate configuration components identical to those in FIG. 4 and hence their description is omitted.

Since the air inlet 116A of the extended air intake duct 116 is provided opposite to the backrest 6b of the seat 6 and separate from the backrest 6b behind the backrest 6b, the cushion of the backrest 6b serves as a sound-absorbing material and the sound of air intake through the air inlet 116A can be reduced.

(2) Although the air inlet 16A of the extended air intake duct 16 has been opened from the inner side in the vehicle width direction to the outward side in the above-mentioned embodiment, without being limited to this configuration, for example, the air inlet 16A may be opened toward the inner side or the rear side in the vehicle width direction or, alternatively, may be opened upward.

(3) Although the portion in the vicinity of the air inlet 16A had a funnel shape in the above-mentioned embodiment, without being limited to this configuration, for example, another shape may be employed like a cylindrical shape and a rectangular parallelepiped shape.

(4) Although the shape of the air inlet 16A has been circular in the above-mentioned embodiment, without being limited to this configuration, for example, the air inlet may have another shape such as an elliptic shape, a triangular shape, and a quadrangular shape.

(5) Although no member has been attached to the air inlet 16A in the above-mentioned embodiment, without being limited to this configuration, for example, in order to avoid entering of dust or the like, a mesh-like member, filter, or the like may be attached to the air inlet.

(6) Although the air inlet 16A has been opposite to the side cover 50 with an interval of 10 mm to 50 mm in between in the above-mentioned embodiment, without being limited to this configuration, for example, the air inlet may be opposite to the side cover with an interval less than 10 mm in between or, alternatively, with an interval greater than 50 mm in between.

Figure 8:
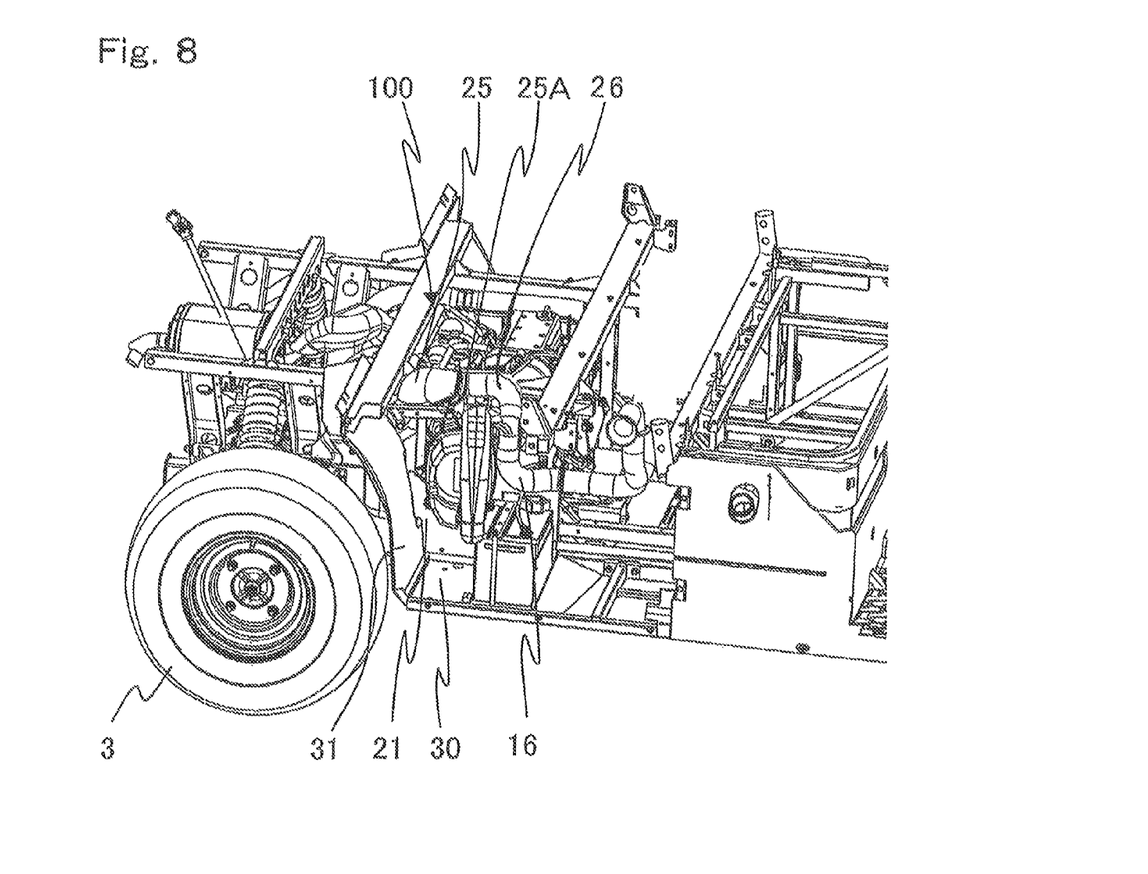
FIG. 8 is a perspective view showing a modification of the intake system for the engine and the V-belt continuously variable transmission, viewed from the diagonally right front.

(7) Although the air inlet 25A of the cooling duct 25 of the V-belt continuously variable transmission 12 is located in the storage box 30 in the above-mentioned embodiment, without being limited to this configuration, for example, as shown in FIG. 8, an extended cooling duct 26 may be connected to one end of the cooling duct 25 and then the extended cooling duct 26 may be connected to the extended air intake duct 16. At that time, the cooling duct 25, the extended cooling duct 26, and the extended air intake duct 16 constitutes a part of an intake system for the V-belt continuously variable transmission. Here, in FIG. 8, identical numerals to those in FIG. 3 indicate configuration components identical to those in FIG. 3 and hence their description is omitted.

(8) Although the seat 6 had a one-row seat configuration in the above-mentioned embodiment, without being limited to this configuration, the seat 6 may have a two-row seat configuration or a three-or-more row seat configuration. At that time, the air inlet of the extended air intake duct is arranged in a space between the cargo bed and the rearmost seat row.

(9) The present invention is not limited to the structure of the above-mentioned embodiment, but includes various modifications that can be devised without departing from the contents described in the appended claims.

What is claimed is:

1. A utility vehicle comprising:
a chassis;
at least one seat row provided on the chassis;
a cargo bed provided behind the at least one seat row;
an engine provided on the chassis;
an intake device for supplying combustion air to the engine; and
a storage box for storing equipment of the engine, wherein the intake device has:
an air intake duct connected to the engine;
an air cleaner device connected to an air-intake upstream end of the air intake duct and stored in the storage box; and
an extended air intake duct connected to an air inlet of the air cleaner device,
wherein an air inlet of the extended air intake duct is located above a lower face of the cargo bed and between the at least one seat row and the cargo bed outside of the storage box.

2. The utility vehicle according to claim 1, comprising a side cover for covering a side of the chassis in a vehicle width direction, wherein the air inlet of the extended air intake duct is directed toward the side cover from an inner side in the vehicle width direction at a fixed interval.

3. The utility vehicle according to claim 1, wherein the air inlet of the extended air intake duct is directed toward a backrest of the at least one seat row from a rear side of the at least one seat row at a fixed interval so as to open toward the backrest.

4. The utility vehicle according to claim 1, comprising:
a V-belt continuously variable transmission linked to the engine; and
a cooling duct connected to the V-belt continuously variable transmission and supplying cooling air to the V-belt continuously variable transmission, wherein
an air inlet of the cooling duct is located in the storage box.

5. A utility vehicle comprising:
a chassis;
at least one seat row provided on the chassis;
a cargo bed provided behind the at least one seat row;
an engine provided on the chassis;
a V-belt continuously variable transmission linked to the engine; and
a cooling duct connected to the V-belt continuously variable transmission and supplying cooling air to the V-belt continuously variable transmission, wherein
an air inlet of the cooling duct is located above a lower face of the cargo bed and between the at least one seat row and the cargo bed outside of the storage box.

6. The utility vehicle according to claim 5, comprising a side cover for covering a side of the chassis, wherein the air inlet of the cooling duct is opposite to the side cover from an inner side in the vehicle width direction at a fixed interval.

7. The utility vehicle according to claim 5, wherein the air inlet of the cooling duct is opposite to a backrest of the at least one seat row from a rear side of the at least one seat row at a fixed interval so as to open toward the backrest.

* * * * *